United States Patent
Dutta et al.

(10) Patent No.: US 9,260,968 B2
(45) Date of Patent: Feb. 16, 2016

(54) SYSTEMS AND METHODS FOR RECONDITIONING TURBINE ENGINES IN POWER GENERATION SYSTEMS

(75) Inventors: Sandip Dutta, Greenville, SC (US); Jaime Javier Maldonado, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 810 days.

(21) Appl. No.: 13/455,965

(22) Filed: Apr. 25, 2012

(65) Prior Publication Data

US 2013/0283812 A1 Oct. 31, 2013

(51) Int. Cl.
F01D 25/00 (2006.01)
F01D 5/00 (2006.01)
F01D 25/32 (2006.01)

(52) U.S. Cl.
CPC .............. *F01D 5/005* (2013.01); *F01D 25/002* (2013.01); *F01D 25/32* (2013.01); *F05D 2230/72* (2013.01); *F05D 2260/607* (2013.01); *Y02E 20/14* (2013.01)

(58) Field of Classification Search
CPC ......... F01D 5/005; F01D 5/182; F01D 5/186; F01D 25/002; F01D 25/32; F05D 2230/72; F05D 2260/607; F02C 3/13; F02C 6/08; F02C 7/18; F02C 9/18
See application file for complete search history.

(56) References Cited

U.S. PATENT DOCUMENTS

| | | | |
|---|---|---|---|
| 2,571,179 A | 10/1951 | Alexander | |
| 3,752,597 A | 8/1973 | Heinold et al. | |
| 5,666,891 A | 9/1997 | Titus et al. | |
| 5,756,957 A | 5/1998 | Titus et al. | |
| 5,798,497 A | 8/1998 | Titus et al. | |
| 5,811,752 A | 9/1998 | Titus et al. | |
| 5,908,564 A | 6/1999 | Titus et al. | |
| 6,037,560 A | 3/2000 | Titus et al. | |
| 6,066,825 A | 5/2000 | Titus et al. | |
| 6,098,395 A * | 8/2000 | North | 60/782 |
| 6,127,645 A | 10/2000 | Titus et al. | |
| 6,160,238 A | 12/2000 | Titus et al. | |
| 6,215,678 B1 | 4/2001 | Titus et al. | |
| 6,394,108 B1 | 5/2002 | Butler | |
| 6,478,033 B1 | 11/2002 | Foster | |
| 6,491,048 B1 | 12/2002 | Foster | |
| 6,503,334 B2 | 1/2003 | Ruiz et al. | |
| 6,630,113 B1 | 10/2003 | Surma | |
| 7,185,663 B2 | 3/2007 | Koch et al. | |
| 7,828,906 B2 | 11/2010 | Bochud et al. | |
| 8,602,724 B2 * | 12/2013 | Takahashi et al. | 415/145 |
| 2002/0124874 A1 | 9/2002 | Butler | |
| 2002/0129837 A1 | 9/2002 | Ruiz et al. | |
| 2004/0016445 A1 | 1/2004 | Koch et al. | |
| 2008/0210264 A1 | 9/2008 | Bochud et al. | |
| 2009/0285670 A1 | 11/2009 | Rivas et al. | |
| 2010/0243001 A1 | 9/2010 | Amcoff et al. | |

* cited by examiner

*Primary Examiner* — Arun Goyal
(74) *Attorney, Agent, or Firm* — Armstrong Teasdale LLP

(57) ABSTRACT

A flow control system is provided. The flow control system includes at least one control valve coupled to at least one nozzle of a turbine engine, wherein the control valve is configured to regulate fluid flow in a first direction or a second direction. The first direction is when the fluid is channeled from a compressor to the nozzle and the second direction is when the fluid is channeled from the nozzle to an exhaust section of the turbine engine. A controller is coupled to the control valve and is configured to control the fluid flow in the first direction during operation of the turbine engine and to change the direction of the fluid flow from the first direction to the second direction to facilitate reconditioning of the turbine engine.

20 Claims, 3 Drawing Sheets

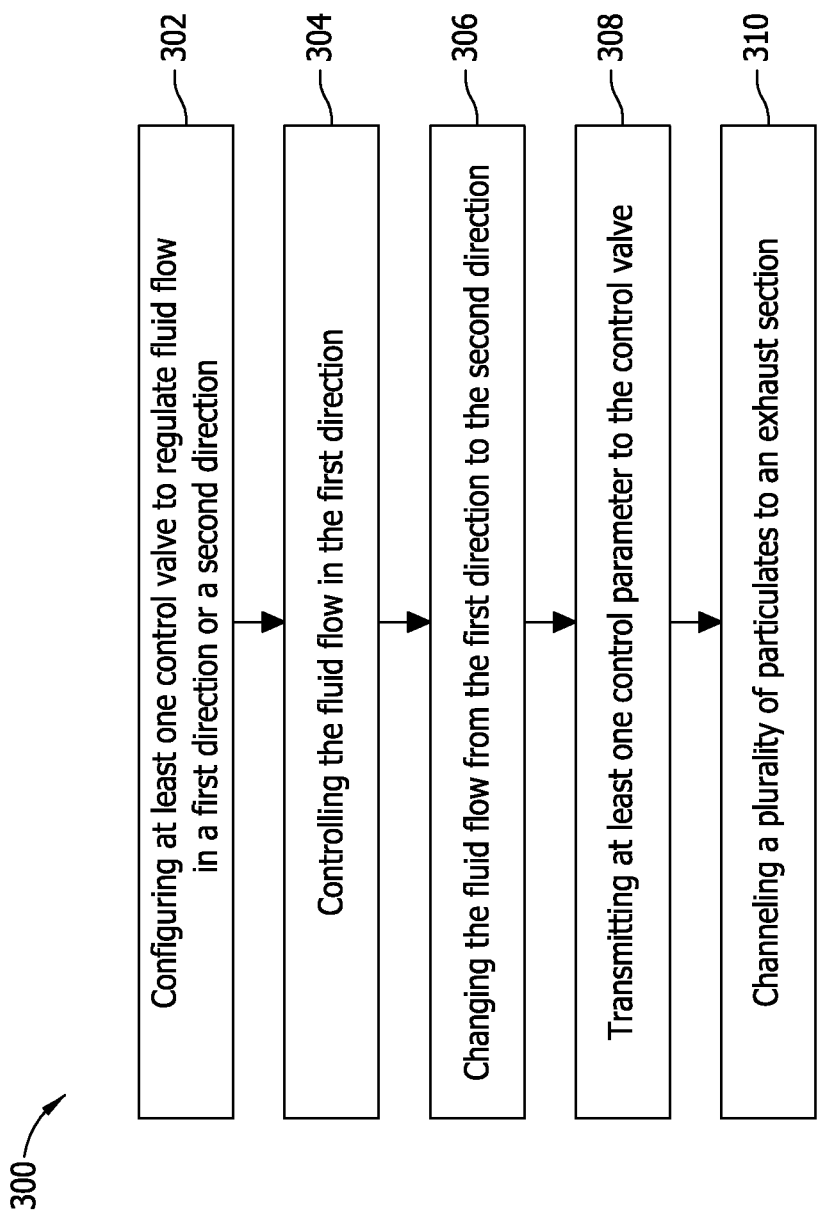

SYSTEMS AND METHODS FOR RECONDITIONING TURBINE ENGINES IN POWER GENERATION SYSTEMS

BACKGROUND OF THE INVENTION

The field of the invention relates generally to power generation systems and, more particularly, to systems and methods for reconditioning turbine engines in power generation systems by coolant flow direction reversals.

At least some known turbine engines are used in power generation systems, such as cogeneration facilities and power plants. Such engines may have high specific work and power per unit mass flow requirements. To increase their operating efficiency, at least some known turbine engines, such as gas turbine engines, operate with increased combustion temperatures. In at least some known gas turbine engines, engine efficiency may increase as combustion gas temperatures increase.

Due to the increase in the combustion gas temperatures, at least some known gas turbine engines use relatively small cooling holes or passages to deliver cooling air to critical areas within the turbine engine. However, dust particles that may be ingested through an inlet of the turbine engine as well as other deposits and debris may become trapped within the cooling holes or passages and substantially limit the flow of cooling fluid there through. Similarly, small metal fragments detach from the engine may also become trapped within the cooling holes or passages. When the cooling holes or passages become blocked, the operating temperature of those components may increase and this temperature increase may cause damage to the components and/or may lead to a premature failure of the components and/or the turbine engine.

To prevent such blockage from occurring, at least some known gas turbine engines use relatively larger holes or passages. However, over time, dust particles and small metal fragments may still accumulate and cause blockages within the larger holes or passages. As a result, at least some known gas turbine engines use a cleaner air supply therein such that the internal cooling holes or passages may be free of deposits. More specifically, at least some known gas turbine engines may be cleaned or reconditioned with a mixture that includes water, steam, and/or air. The mixture is injected at the inlet of the gas turbine engine in an attempt to remove deposits that are formed on, for example, the gas-path surface of the airfoils. However, it may be difficult to channel the mixture to inside the cooling passages that are formed in the airfoil. As a result, blockages within the cooling holes or passages may still form.

BRIEF DESCRIPTION OF THE INVENTION

In one embodiment, a flow control system is provided. The flow control system includes at least one control valve coupled to at least one nozzle of a turbine engine, wherein the control valve is configured to regulate fluid flow in a first direction or a second direction. The first direction is when the fluid is channeled from a compressor to the nozzle and the second direction is when the fluid is channeled from the nozzle to an exhaust section of the turbine engine. A controller is coupled to the control valve and is configured to control the fluid flow in the first direction during operation of the turbine engine and to change the direction of the fluid flow from the first direction to the second direction to facilitate reconditioning of the turbine engine.

In another embodiment, a power generation system is provided. The power generation system includes a turbine engine that includes a compressor, at least one nozzle coupled to the compressor, and an exhaust section coupled to the nozzle. The power generation system also includes a flow control system coupled to the turbine engine. The flow control system includes at least one control valve that is coupled to the nozzle, wherein the control valve is configured to regulate fluid flow in a first direction or a second direction. The first direction is when the fluid is channeled from the compressor to the nozzle and the second direction is when the fluid is channeled from the nozzle to the exhaust section. A controller is coupled to the control valve and is configured to control the fluid flow in the first direction during operation of the turbine engine and to change the direction of the fluid flow from the first direction to the second direction to facilitate reconditioning of the turbine engine.

In yet another embodiment, a method for reconditioning a turbine engine in a power generation system is provided. At least one control valve that is coupled to at least one nozzle of the turbine engine is configured to regulate fluid flow in a first direction or a second direction. The first direction is when the fluid is channeled from a compressor to the nozzle and the second direction is when the fluid is channeled from the nozzle to an exhaust section of the turbine engine. The fluid flow is controlled in the first direction during operation of the turbine engine, via a controller that is coupled to the control valve. The direction of the fluid flow is changed from the first direction to the second direction, via the controller, to facilitate reconditioning of the turbine engine.

BRIEF DESCRIPTION OF THE DRAWINGS

FIG. 3 is a flow chart of an exemplary method of reconditioning a turbine engine in the power generation system shown in FIG. 1.

DETAILED DESCRIPTION OF THE INVENTION

The exemplary systems and methods described herein provide a flow control system along with an exemplary flow network that may be used in a power generation system to enable reconditioning of a turbine engine coolant lines or conduits. The flow control system includes at least one control valve coupled to at least one nozzle of a turbine engine, wherein the control valve is configured to regulate fluid flow in a first direction or a second direction. The first direction is when the fluid is channeled from a compressor to the nozzle and the second direction is when the fluid is channeled from the nozzle to an exhaust section of the turbine engine. A controller is coupled to the control valve and is configured to selectively control the fluid flow in the first direction during operation of the turbine engine and to change the direction of the fluid flow from the first direction to the second direction to facilitate reconditioning of the turbine engine. By selectively reversing or changing the direction of the fluid flow, particulates and deposits that are positioned within cooling passages and/or within the nozzles and shrouds of the turbine engine may be removed and channeled to the exhaust section of the turbine engine. As such, blockages within the cooling holes or passages within the turbine engine may be substantially reduced.

Figure 1:
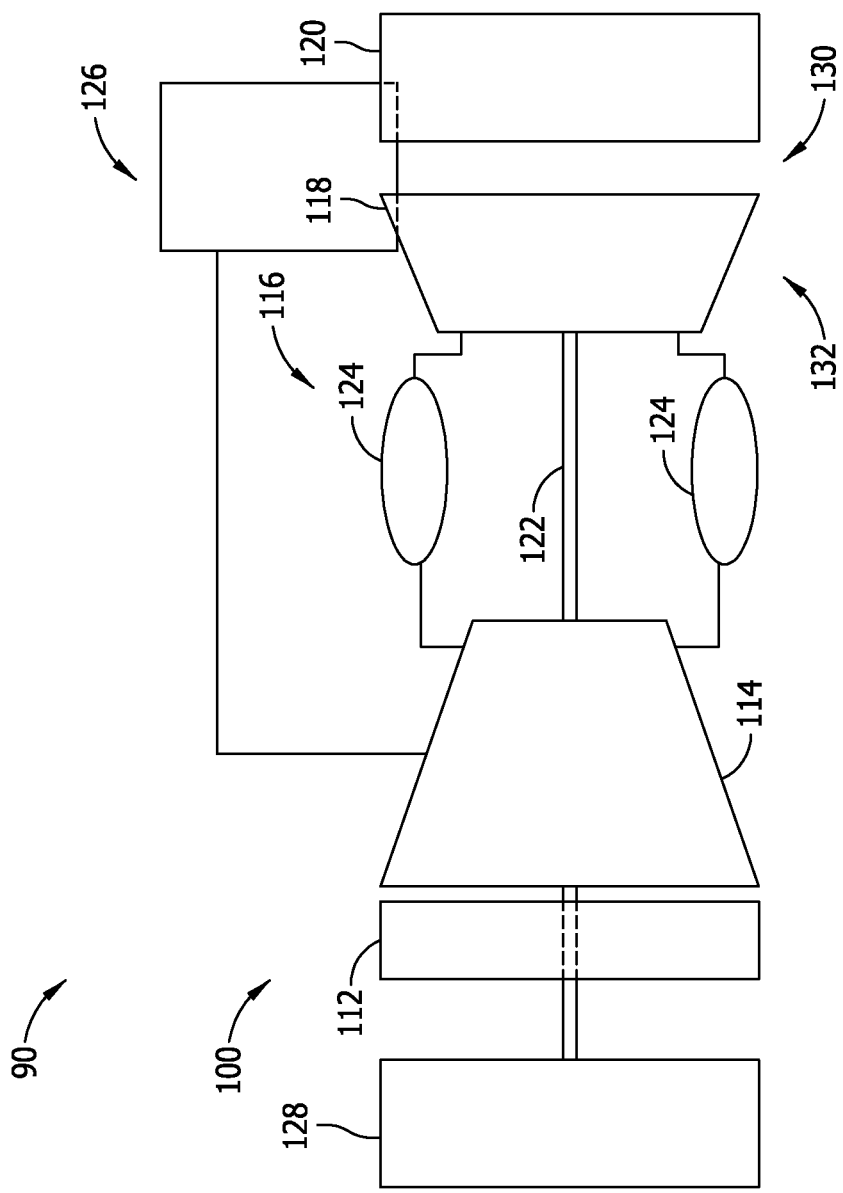
FIG. 1 is a block diagram of an exemplary power generation system.

FIG. 1 illustrates an exemplary power generation system 90 that includes at least one turbine engine 100. More specifically, in the exemplary embodiment, turbine engine 100 is a gas turbine engine. While the exemplary embodiment is directed towards a gas turbine engine, the present invention is not limited to any one particular engine, and one of ordinary skill in the art will appreciate that the current invention may be used in connection with other turbine engines, such as a steam turbine or a combined cycle system. It should also be noted that, as used herein, the term "couple" is not limited to a direct mechanical, thermal, communication, and/or an electrical connection between components, but may also include an indirect mechanical, thermal, communication and/or electrical connection between multiple components.

Moreover, in the exemplary embodiment, turbine engine 100 includes an intake section 112, a compressor section 114 coupled downstream from intake section 112, a combustor section 116 coupled downstream from compressor section 114, a turbine section 118 coupled downstream from combustor section 116, and an exhaust section 120. Turbine section 118 is coupled to compressor section 114 via a rotor shaft 122. In the exemplary embodiment, combustor section 116 includes a plurality of combustors 124. Combustor section 116 is coupled to compressor section 114 such that each combustor 124 is positioned in flow communication with the compressor section 114.

Power generation system 90 also includes a flow control system 126 that is coupled to turbine engine 100. More specifically, in the exemplary embodiment, flow control system 126 may be coupled to each of turbine section 118, compressor section 114, and exhaust section 120. Moreover, turbine section 118 is coupled to compressor section 114 and to a load 128 such as, but not limited to, an electrical generator and/or a mechanical drive application. In the exemplary embodiment, each compressor section 114 and turbine section 118 includes at least one rotor disk assembly 130 that is coupled to a rotor shaft 122 to form a rotor assembly 132.

During operation, intake section 112 channels air towards compressor section 114 wherein the air is compressed to a higher pressure and temperature prior to being discharged towards combustor section 116. The compressed air is mixed with fuel and ignited to generate combustion gases that are channeled towards turbine section 118. More specifically, in combustors 124, fuel, for example, natural gas and/or fuel oil, is injected into the air flow, and the fuel-air mixture is ignited to generate high temperature combustion gases that are channeled towards turbine section 118. Turbine section 118 converts the thermal energy from the gas stream to mechanical rotational energy, as the combustion gases impart rotational energy to turbine section 118 and to rotor assembly 132. Moreover, as explained in more detail below, flow control system 126 selectively controls a fluid flow, such as a cooling fluid flow, within turbine engine 100 to facilitate the cleaning or reconditioning of turbine engine 100.

Figure 2:
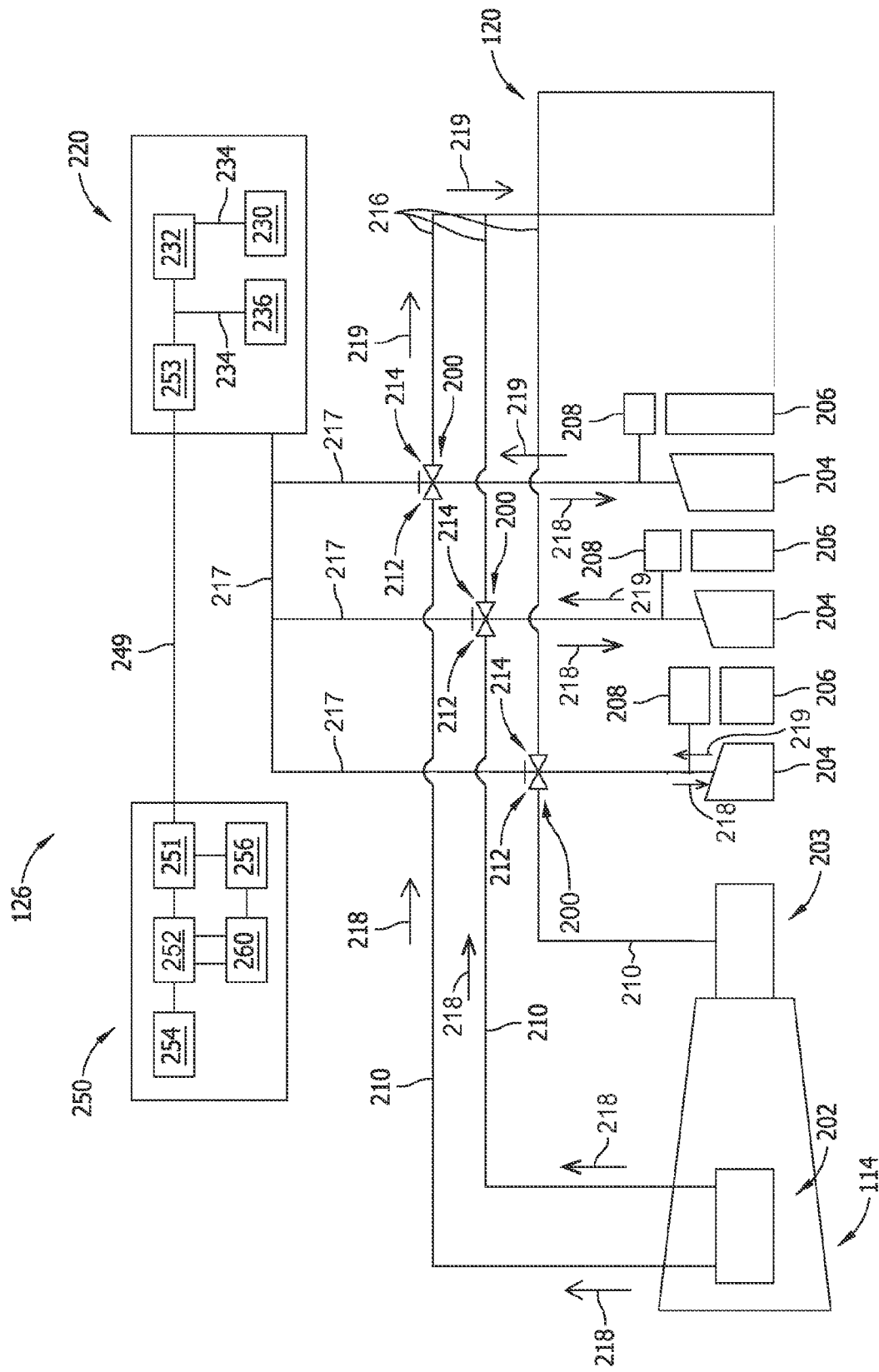
FIG. 2 is a block diagram of an exemplary flow control system that may be used with the power generation system shown in FIG. 1.

FIG. 2 is a block diagram of flow control system 126. In the exemplary embodiment, flow control system 126 includes at least one control valve 200. More specifically, flow control system 126 includes three control valves 200, wherein each valve 200 is coupled to a compressor 202, such as a multi-stage compressor, and to a nozzle 204. In the exemplary embodiment, turbine engine 100 (shown in FIG. 1) includes three nozzles 204 that are each positioned proximate to a rotating rotor bucket or blade 206, and each blade 206 is positioned proximate to a stator blade 208. A compressor discharge 203 is coupled downstream from stator blade 208. A plurality of cooling passages (not shown) are defined within turbine engine, such as between nozzles 204 and exhaust section 120.

Moreover, in the exemplary embodiment, at least one fluid conduit 210 extends from compressor 202 to nozzles 204. More specifically, one conduit 210 extends from compressor 202 to one nozzle 204. One control valve 200 is coupled to each conduit 210 such that control valve 200 is positioned between compressor 202 and nozzle 204. More specifically, each control valve 200 includes a first portion 212 and a second portion 214, wherein conduit 210 is coupled to control valve first portion 212 such that each control valve 200 may be coupled in flow communication with compressor 202 and nozzle 204. Further, at least one fluid conduit 216 extends from exhaust section 120 to nozzles 204. More specifically, one conduit 216 extends from exhaust section 120 to one nozzle 204. Conduit 216 is coupled to control valve second portion 214 such that control valve 200 may also be coupled in flow communication with exhaust section 120 and nozzle 204. In the exemplary embodiment, conduits 210 and 216 are configured to channel cooling fluid therein. Alternatively, conduits 210 and 216 may channel any other type of fluid therein.

In the exemplary embodiment, each control valve 200 is modulated in an open, partially open, closed, and/or partially closed position to selectively control the flow of the fluid within conduits 210 and 216. For example, control valve 200 is configured to regulate the fluid flow in a first direction, as shown by arrows 218, from compressor 202 to nozzle 204. Control valve 200 also selectively regulates the fluid flow in an opposite second direction, as shown by arrows 219, from nozzle 204 to exhaust section 120. Alternatively, control valve 200 may be modulated in any other manner that enables flow control system 126 and/or power generation system (shown in FIG. 1) 90 to function as described herein.

Flow control system 126 also includes a controller 220 that is Operatively coupled to each control valve 200 via a respective control line 217. In the exemplary embodiment, controller 220 is configured to control each valve 200 to control the fluid flow within conduits 210 and 216. For example, controller 220 is configured to control the fluid flow in the first direction 218 and/or the second direction 219. Controller 220 is also configured to change the fluid flow from the first direction 218 to the second direction 219 and/or from the second direction 219 to the first direction 218. Controller 220 is enabled to facilitate operative opening and closing features of each valve 200, via features that include, without limitation, receiving permissive inputs, transmitting permissive outputs, and transmitting opening and closing commands.

In the exemplary embodiment, controller 220 may be a real-time controller and may include any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 220 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

In the exemplary embodiment, controller 220 includes a memory device 230 that stores executable instructions and/or one or more operating parameters representing and/or indicating an operating condition of turbine engine 100. In the exemplary embodiment, controller 220 also includes a processor 232 that is coupled to memory device 230 via a system bus 234. In one embodiment, processor 232 may include a processing unit, such as, without limitation, an integrated circuit (IC), an application specific integrated circuit (ASIC), a microcomputer, a programmable logic controller (PLC), and/or any other programmable circuit. Alternatively, processor 232 may include multiple processing units (e.g., in a multi-core configuration). The above examples are exemplary only, and thus are not intended to limit in any way the definition and/or meaning of the term "processor."

Moreover, in the exemplary embodiment, controller 220 includes a control interface 236 that is coupled to valves 200 and that is configured to control an operation of each valve 200. For example, processor 232 may be programmed to generate one or more control parameters that are transmitted to control interface 236. Control interface 236 may then transmit a control parameter to modulate, open, or close valves 200.

Various connections are available between control interface 236 and valves 200. Such connections may include, without limitation, an electrical conductor, a low-level serial data connection, such as Recommended Standard (RS) 232 or RS-485, a high-level serial data connection, such as USB, a field bus, a PROFIBUS®, or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside turbine engine 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz.

In the exemplary embodiment, flow control system 126 may also include a user computing device 250 that is coupled to controller 220 via a network 249. More specifically, user computing device 250 includes a communication interface 251 that is coupled to a communication interface 253 contained within controller 220. User computing device 250 includes a processor 252 for executing instructions. In some embodiments, executable instructions are stored in a memory device 254. Processor 252 may include one or more processing units (e.g., in a multi-core configuration). Memory device 254 is any device allowing information, such as executable instructions and/or other data, to be stored and retrieved.

User computing device 250 also includes at least one media output component 256 for use in presenting information to a user (not shown). Media output component 256 is any component capable of conveying information to the user. Media output component 256 may include, without limitation, a display device (not shown) (e.g., a liquid crystal display (LCD), an organic light emitting diode (OLED) display, or an audio output device (e.g., a speaker or headphones)).

Moreover, in the exemplary embodiment, user computing device 250 includes input interface 260 for receiving input from the user. Input interface 260 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 256 and input interface 260.

During operation, a user may input commands via input interface 260 of computing device 250. In the exemplary embodiment, the commands may include a first command to have the fluid flow occur in the first direction 218 during normal operation of turbine engine 100 to facilitate cooling of turbine engine 100. Signals representative of such a command are transmitted to communication interface 253 of controller 220. The signal is then transmitted to each control valve 200. Each control valve 200 is modulated to facilitate fluid flow within conduits 210 such that fluid may be channeled from compressor 202 to nozzles 204. For example, the fluid may be channeled within the cooling passages or holes within turbine engine 100. In the exemplary embodiment, each control valve 200 is also modulated such that fluid flow is inhibited within conduits 216 and the fluid is not being channeled in the second direction 219, from nozzles 204 to exhaust section 120.

Flow control system 126 can also control the fluid flow to facilitate the cleaning or reconditioning of turbine engine 100. For example, the user can input a command to computing device 250 to change or reverse the fluid flow from the first direction 218 to the second direction 219 during shut down of the turbine engine 100. Signals representative of the command are transmitted to communication interface 253 of controller 220. The signal is then transmitted to each control valve 200. Each control valve 200 is then modulated to facilitate fluid flow within conduits 216 such that fluid may be channeled from nozzles 204 to exhaust section 120. In the exemplary embodiment, each control valve 200 is also modulated such that fluid flow is inhibited within conduits 210 and the fluid is no longer being channeled in the first direction 218, from compressor 202 to nozzles 204. When the fluid flow is reversed or changed from the first direction 218 to the second direction 219, the fluid flows within the plurality of cooling passages defined between nozzles 204 and exhaust section 120. The fluid flow facilitates particulates, such as dust particles, deposits, and/or small metal fragments, that may be trapped within the cooling passages to be removed and channeled to exhaust section 120. The fluid flow also facilitates particulates that are positioned proximate to and/or within nozzles 204 to be removed and channeled to exhaust section 120. Accordingly, blockages within the cooling passages that are caused by the particulates may be inhibited.

Moreover, because the fluid flow in the second direction 219 occurs during shut down of turbine engine 100, temperatures within turbine engine 100 can be maintained within material limits. Fluid flow in the second direction 219 can also occur during start up of turbine engine to ensure temperatures within turbine engine can be maintained within material limits. In fact, it is suitable to have the fluid flow occur in the second direction 219 for reconditioning turbine engine 100 during start up and/or shut down of turbine engine 100, as opposed to during operation of turbine engine 100. As such, temperatures within turbine engine 100 can be maintained within material limits.

In addition to the commands given by the operator, controller 220 may be programmed to control fluid flow automatically at various operational states of turbine engine 100. For example, controller 220 may be programmed to have fluid flow occur in the first direction 218 during operation of turbine engine 100 and in the second direction 219 during start up and shut down of turbine engine 100 in order to recondition turbine engine 100. As such, during operation of turbine engine 100, controller 220 transmits a signal to each control valve 200. Each control valve 200 is modulated to facilitate fluid flow within conduits 210 such that fluid may be channeled from compressor 202 to nozzles 204. Each control valve 200 is also then modulated such that fluid flow is inhibited within conduits 216 and fluid is not being channeled in the second direction 219, from nozzles 204 to exhaust section 120. Then, during start up or shut down of turbine engine 100, controller 220 transmits a signal to each control valve 200 to change the fluid flow from the first direction 218 to the second direction 219 to clean or recondition turbine engine 100. More specifically, the control valve 200 is modulated to facilitate fluid flow within conduits 216 such that fluid may be channeled from nozzles 204 to exhaust section 120. Each control valve 200 is also modulated such that fluid flow is inhibited within conduits 210 and the fluid is no longer being channeled in the first direction 218, from compressor 202 to nozzles 204.

FIG. 3 is a flow chart of an exemplary method 300 of reconditioning a turbine engine, such as turbine engine 100 (shown in FIG. 1) in a power generation system, such as power generation system 90 (shown in FIG. 1). At least one control valve 200 (shown in FIG. 2) that is coupled to at least one nozzle 204 (shown in FIG. 2) is configured 302 to regulate fluid flow in a first direction 218 (shown in FIG. 2) or a second direction 219 (shown in FIG. 2), wherein the first direction 218 includes the fluid being channeled from a compressor 202 (shown in FIG. 2) to nozzle 204 and the second direction 219 includes the fluid being channeled from nozzle 204 to an exhaust section 120 (shown in FIGS. 1 and 2).

The fluid flow is controlled 304 in the first direction 218 during operation of turbine engine 100, via a controller 220 (shown in FIG. 2) that is coupled to control valve 200. For example, a user may input commands to a computing device 250 (shown in FIG. 2) to have the fluid flow occur in the first direction 218 during normal operation of turbine engine 100 to facilitate cooling of turbine engine 100. Signals representative of such a command are transmitted to a controller 220 (shown in FIG. 2) such that the signal may be transmitted to each control valve 200 (shown in FIG. 2). Each control valve 200 is modulated to facilitate fluid flow within conduits 210 (shown in FIG. 2) such that fluid may be channeled from compressor 202 to nozzles 204.

The fluid flow is changed 306 during start up and/or shut down of turbine engine 100 from the first direction 218 to the second direction 219, via controller 220, to facilitate reconditioning of turbine engine 100. For example, the user can input a command to computing device 250 to change or reverse the fluid flow from the first direction 218 to the second direction 219 during start up and/or shut down of the turbine engine 100.

At least one control parameter is transmitted 308 via at least one signal from controller 220 to control valves 200. When the control parameter is transmitted 308 to control valves 200, each control valve 200 is then modulated to facilitate fluid flow within conduits 216 such that fluid may be channeled from nozzles 204 to exhaust section 120. Moreover, each control valve 200 is also modulated such that fluid flow is inhibited within conduits 210 and the fluid is no longer being channeled in the first direction 218, from compressor 202 to nozzles 204.

A plurality of particulates positioned within a plurality of cooling passages (not shown) of turbine engine 100 and/or particulates that are positioned within nozzle 204 are enabled to be channeled 310 to exhaust section 120. More specifically, the fluid flow facilitates particulates, such as dust particles, deposits, and/or small metal fragments, that may be trapped within the cooling passages to be removed and channeled to exhaust section 120. The fluid flow also facilitates particulates that are positioned proximate to and/or within nozzles 204 to be removed and channeled to exhaust section 120. Accordingly, method 300 may inhibit blockages within the cooling passages that are caused by the particulates.

As compared to known control systems that are used to clean or recondition turbine engine, the embodiments described herein provide a flow control system that reverses fluid flow, such as cooling fluid flow, within the turbine engine such that particulates may be removed from within the turbine engine. The flow control system includes at least one control valve coupled to at least one nozzle of a turbine engine, wherein the control valve is configured to regulate fluid flow in a first direction or a second direction. The first direction is when the fluid is channeled from a compressor to the nozzle and the second direction is when the fluid is channeled from the nozzle to an exhaust section of the turbine engine. A controller is coupled to the control valve and is configured to selectively control the fluid flow in the first direction during operation of the turbine engine and to change the direction of the fluid flow from the first direction to the second direction to facilitate reconditioning of the turbine engine. By selectively reversing or changing the direction of the fluid flow, particulates that are positioned within cooling passages and/or within the nozzles of the turbine engine may be removed and channeled to the exhaust section of the turbine engine. As such, blockages within the cooling holes or passages within the turbine engine may be substantially reduced.

A technical effect of the systems and methods described herein includes at least one of: (a) controlling fluid flow in a first direction during operation of a turbine engine; and (b) changing the direction of the fluid flow from a first direction to a second direction to facilitate reconditioning of a turbine engine.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control system comprising:
   at least one control valve coupled to at least one nozzle of a turbine section in a turbine engine and operable to change a direction of a fluid flow of a fluid in at least one conduit that extends between the at least one nozzle and said at least one control valve, wherein in a first direction the fluid is channeled from a compressor through the at least one conduit to the at least one nozzle and wherein in a second direction the fluid is channeled from the at least one nozzle through the at least one conduit to an exhaust section bypassing downstream section of the turbine section of the turbine engine; and a controller coupled to said at least one control valve, said controller configured to:

control the fluid flow in the first direction during operation of the turbine engine; and change the direction of the fluid flow from the first direction to the second direction to facilitate reconditioning of the turbine engine.

2. A flow control system in accordance with claim 1, wherein said at least one control valve comprises a first control valve, a second control valve, and a third control valve, said first control valve is coupled to a first nozzle, said second control valve is coupled to a second nozzle, and said third control valve is coupled to a third nozzle.

3. A flow control system in accordance with claim 1, wherein said at least one conduit includes a plurality of cooling passages defined within the turbine engine.

4. A flow control system in accordance with claim 3, wherein said controller is configured to change the direction of the fluid flow to cause particulates within the plurality of cooling passages to be channeled to the exhaust section.

5. A flow control system in accordance with claim 1, wherein said controller is configured to change the direction of the fluid flow to cause a plurality of particulates within the at least one nozzle to be channeled to the exhaust section.

6. A flow control system in accordance with claim 1, wherein said controller is configured to change the direction of the fluid flow during at least one of a start up of the turbine engine and a shut down of the turbine engine.

7. A flow control system in accordance with claim 1, wherein said controller is configured to change the direction of the fluid flow by transmitting at least one control parameter via at least one signal to said at least one control valve.

8. A power generation system comprising:

a turbine engine comprising a turbine, at least one nozzle coupled to said turbine, and an exhaust section coupled to said at least one nozzle; and a flow control system coupled to said turbine engine, said flow control system comprising:

at least one control valve coupled to said at least one nozzle and operable to change a direction of a fluid flow of a fluid in at least one conduit that extends between said at least one nozzle and said at least one control valve, wherein in a first direction the fluid is channeled from a compressor through the at least one conduit to said at least one nozzle and wherein in a second direction the fluid is channeled from said at least one nozzle through the at least one conduit to said exhaust section bypassing downstream section of the turbine; and a controller coupled to said at least one control valve, said controller configured to:

control the fluid flow in the first direction during operation of said turbine engine; and change the direction of the fluid flow from the first direction to the second direction to facilitate reconditioning of said turbine engine.

9. A power generation system in accordance with claim 8, wherein said at least one control valve comprises a first control valve, a second control valve, and a third control valve, said at least one nozzle includes a first nozzle coupled to said first control valve, a second nozzle coupled to said second control valve, and a third nozzle coupled to said third control valve.

10. A power generation system in accordance with claim 8, wherein said at least one conduit comprises a plurality of cooling passages defined between said at least one nozzle and said exhaust section, said at least one control valve is configured to regulate the fluid flow within said plurality of cooling passages.

11. A power generation system in accordance with claim 10, wherein said controller is configured to change the direction of the fluid flow to cause particulates within said plurality of cooling passages to be channeled to said exhaust section.

12. A power generation system in accordance with claim 8, wherein said controller is configured to change the direction of the fluid flow from to cause particulates within said at least one nozzle to be channeled to said exhaust section.

13. A power generation system in accordance with claim 8, wherein said controller is configured to change the direction of the fluid flow from during at least one of a start up of said turbine engine and a shut down of said turbine engine.

14. A power generation system in accordance with claim 8, wherein said controller is configured to change the direction of the fluid flow by transmitting at least one control parameter via at least one signal to said at least one control valve.

15. A method for reconditioning a turbine engine in a power generation system, said method comprising:

operating at least one control valve that is coupled to at least one nozzle in a turbine section of the turbine engine to change a direction of a fluid flow of a fluid in at least one conduit that extends between the at least one nozzle and the at least one control valve, wherein in a first direction the fluid is channeled from a compressor through the at least one conduit to the at least one nozzle and wherein in a second direction the fluid is channeled from the at least one nozzle through the at least one conduit to an exhaust section bypassing downstream section of the turbine section of the turbine engine;

controlling the fluid flow in the first direction during operation of the turbine engine, via a controller that is coupled to the at least one control valve; and changing the direction of the fluid flow from the first direction to the second direction, via the controller, to facilitate reconditioning of the turbine engine.

16. A method in accordance with claim 15, wherein operating the at least one control valve further comprise operating the at least one control valve to regulate the fluid flow within the at least one conduit that includes a plurality of cooling passages defined between the at least one nozzle and the exhaust section.

17. A method in accordance with claim 16, wherein changing the direction of the fluid flow further comprises changing the direction of the fluid flow such that particulates within the plurality of cooling passages are channeled to the exhaust section.

18. A method in accordance with claim 15, wherein changing the direction of the fluid flow further comprises changing the direction of the fluid flow such that particulates within the at least one nozzle are channeled to the exhaust section.

19. A method in accordance with claim 15, wherein changing the direction of the fluid flow further comprises changing the direction of the fluid flow during at least one of a start up of the turbine engine and a shut down of the turbine engine.

20. A method in accordance with claim 15, wherein changing the direction of the fluid flow further comprises changing the direction of the fluid flow by transmitting at least one control parameter via at least one signal to said at least one control valve.

* * * * *